United States Patent
Boutcher (10) Patent No.: US 7,752,170 B2
(45) Date of Patent: *Jul. 6, 2010

(54) IMPLEMENTING DYNAMIC COPY-ON-WRITE (COW) STORAGE COMPRESSION IN COW STORAGE THROUGH ZERO AND DELETED BLOCKS

(75) Inventor: David Charles Boutcher, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 648 days.

This patent is subject to a terminal disclaimer.

(21) Appl. No.: 11/619,363

(22) Filed: Jan. 3, 2007

(65) Prior Publication Data
US 2008/0162841 A1    Jul. 3, 2008

(51) Int. Cl.
G06F 13/00 (2006.01)
(52) U.S. Cl. .............. 707/640; 707/821; 711/154; 711/159; 711/161; 711/162; 711/170
(58) Field of Classification Search ............ 711/161, 711/170, 154, 159, 162; 707/205, 640, 821
See application file for complete search history.

(56) References Cited

U.S. PATENT DOCUMENTS

| 6,606,685 | B2 * | 8/2003 | Huxoll ................. 711/118 |
| 7,225,314 | B1 * | 5/2007 | Bonwick et al. ......... 711/170 |
| 2004/0083345 | A1 * | 4/2004 | Kim et al. ............. 711/162 |
| 2005/0027956 | A1 * | 2/2005 | Tormasov et al. ....... 711/162 |
| 2008/0082593 | A1 * | 4/2008 | Komarov et al. ........ 707/204 |
| 2008/0109469 | A1 * | 5/2008 | Krauss ................ 707/102 |
| 2008/0162842 | A1 * | 7/2008 | Boutcher .............. 711/161 |

OTHER PUBLICATIONS

Ron Yorston, "Keeping filesystem images sparse", http://intgat.tigress.co.uk/rmy/uml/sparsify.html, printed Dec. 8, 2006.
Sivathanu, et al., "Life or Death at Block-Level", USENIX Association, OSDI '04: 6th Symposium on Operating Systems Design the Implementation, pp. 379-394.
http://lists.xensource.com/archives/html/xen-users/2006-01/msg00980.html, "Re: [Xen-users] Re: cow implementation—Xen Source", printed Jul. 6, 2006.

* cited by examiner

*Primary Examiner*—Hong Kim
(74) *Attorney, Agent, or Firm*—Joan Pennington (57) ABSTRACT

Methods, apparatus and computer program product implement enhanced dynamic copy-on-write storage compression. For a write operation, a freed block is detected by the COW storage for compressing freed blocks from the COW storage. Responsive to the detected freed block being a previously written block in the COW storage, the previously written block in the COW storage is deleted from the COW storage. Responsive to the detected freed block not being a previously written block in the COW storage, the block is marked as zero in the COW storage.

20 Claims, 9 Drawing Sheets

IMPLEMENTING DYNAMIC COPY-ON-WRITE (COW) STORAGE COMPRESSION IN COW STORAGE THROUGH ZERO AND DELETED BLOCKS

RELATED APPLICATION

Related copending U.S. patent application Ser. No. 11/619,398, entitled "METHOD AND APPARATUS FOR IMPLEMENTING DYNAMIC COPY-ON-WRITE STORAGE COMPRESSION THROUGH PURGE FUNCTION" by the present inventor and assigned to the present assignee filed on the same day as the present patent application.

FIELD OF THE INVENTION

The present invention relates generally to the data processing field, and more particularly, relates to a method, apparatus and computer program product for implementing enhanced dynamic copy-on-write (COW) storage compression in a COW storage.

DESCRIPTION OF THE RELATED ART

Figure 2:
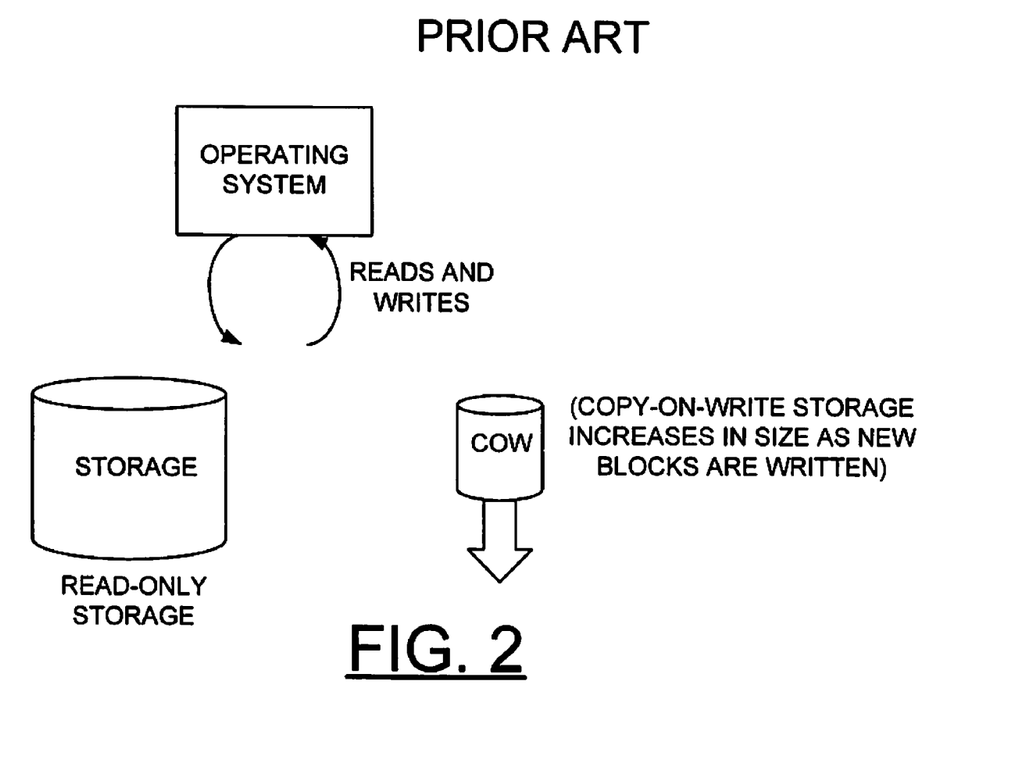
FIGS. 2 and 3 illustrate prior art copy-on-write (COW) implementations.
Figure 3:
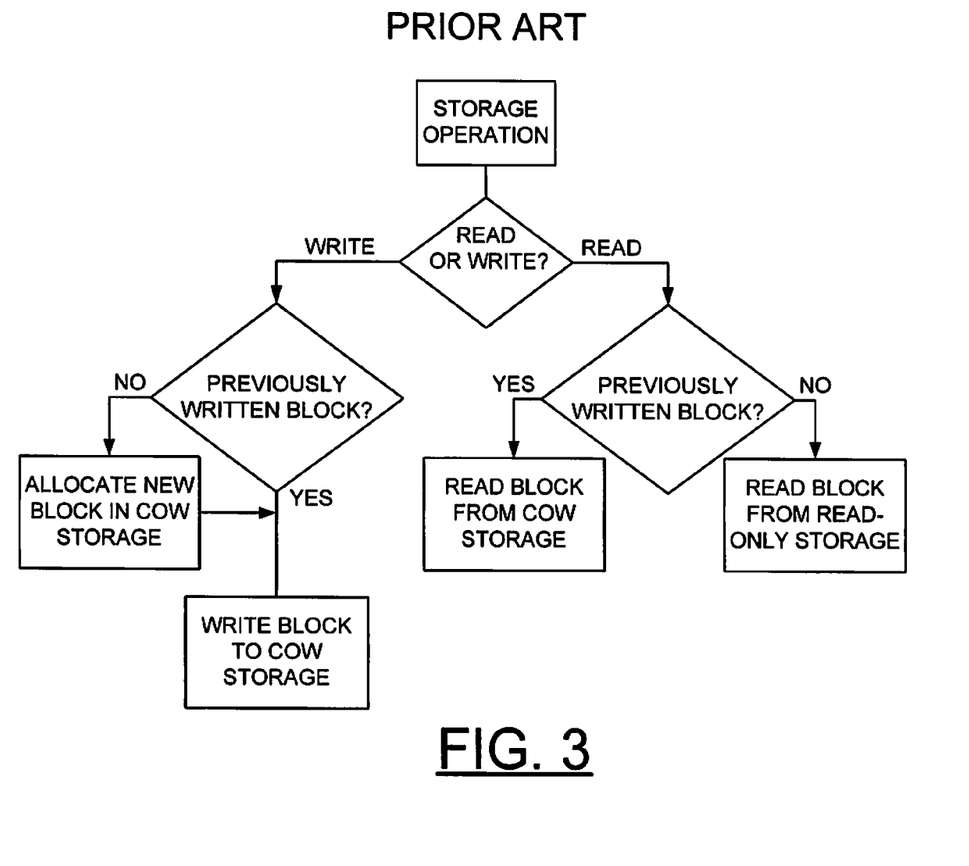

FIGS. 2 and 3 illustrate prior art copy-on-write (COW) implementations. As shown in the illustrated operating system view of storage in FIG. 2, the copy-on-write storage increases in size as new blocks are written. In FIG. 3, read and write storage operations are shown. For a read operation of a previously written block, the block is read from COW storage. Otherwise, the block is read from the read-only storage. For a write operation of a previously written block, the block is written to the COW storage. Otherwise, a new block is allocated in the COW storage, and then the block is written to the COW storage. Note that all write operations result in either a new block being allocated in the COW storage, or an existing block in the COW storage being written.

Copy-on-write (COW) storage is being increasingly used to manage large amounts of data stored on intelligent storage devices. Examples include snapshot copies of storage on Storage Area Networks, as well as implementations in a number of current virtualization products such as VMWare and XEN. A COW storage implementation has static, unchanging, backing storage, and one or more smaller storage sets containing only the changed blocks.

A typical example of such COW storage includes use for supporting many similar virtualized operating systems within a single physical system. A base version of the filesystem, with the operating system and applications installed, is created. For every operating system instance that uses the base system, a separate copy-on-write storage area is allocated which contains only blocks of the filesystem written to by the operating system.

The COW approach is useful because in most cases, the base version of the operating system and application files are not modified by the various operating systems and can be shared by all. The approach is used for virtualizing a wide variety of operating systems, including Microsoft Windows and Linux.

A problem with existing COW implementations is that they are often implemented at the block, or storage, layer, with no awareness of the filesystems and data structures stored within them. This means that deleted, or stale data typically is stored in the COW copy. A prototypical example would be copying 100 MB of data into a COW backed filesystem and later deleting the data. The deleted data still occupies 100 MB of space on the COW device since the storage subsystem cannot differentiate between blocks used by current files, and blocks containing only deleted data.

Fundamentally existing COW implementations only grow as new blocks are written and never shrink.

A source of the problem is the conventional narrow interface between the filesystem and block storage layers of modern computing systems. The block layer, such as small computer system interface (SCSI), integrated drive electronics (IDE), or storage area network (SAN), typically only supports a limited number of primitive operations, such as "read block" and "write block" that do not allow for information about the liveness of the data.

A need exists for an improved mechanism for implementing copy-on-write storage.

SUMMARY OF THE INVENTION

Principal aspects of the present invention are to provide methods, apparatus and computer program product for implementing enhanced dynamic copy-on-write storage compression. Other important aspects of the present invention are to provide such methods, apparatus and computer program product for implementing enhanced dynamic copy-on-write storage compression substantially without negative effect and that overcome many of the disadvantages of prior art arrangements.

In brief, methods, apparatus and computer program product are provided for implementing enhanced dynamic copy-on-write storage compression. For a write operation, a freed block is detected by the COW storage for compressing zero blocks from the COW storage. Responsive to the detected freed block being a previously written block in the COW storage, the previously written block in the COW storage is deleted from the COW storage. Responsive to the detected freed block not being a previously written block in the COW storage, the block is marked as zero in the COW storage.

In accordance with features of the invention, a freed block is zeroed by the filesystem. The block for the write operation including all zeros is used to identify a freed block by the COW storage. Also a pointer to a zero page is used to identify a freed block by the COW storage.

In accordance with features of the invention, a freed block is deleted from the filesystem. The COW storage having a semantic understanding of the filesystem, analyzes the write operation and identifies a block being deleted from the filesystem to identify a freed block.

In accordance with features of the invention, with a COW control program in a system correct functional operation is maintained for a COW storage and operating system in the system implemented without implementing changes to the filesystem. Also correct functional operation is maintained for a COW storage and operating system in a system implemented without implementing a COW control program.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
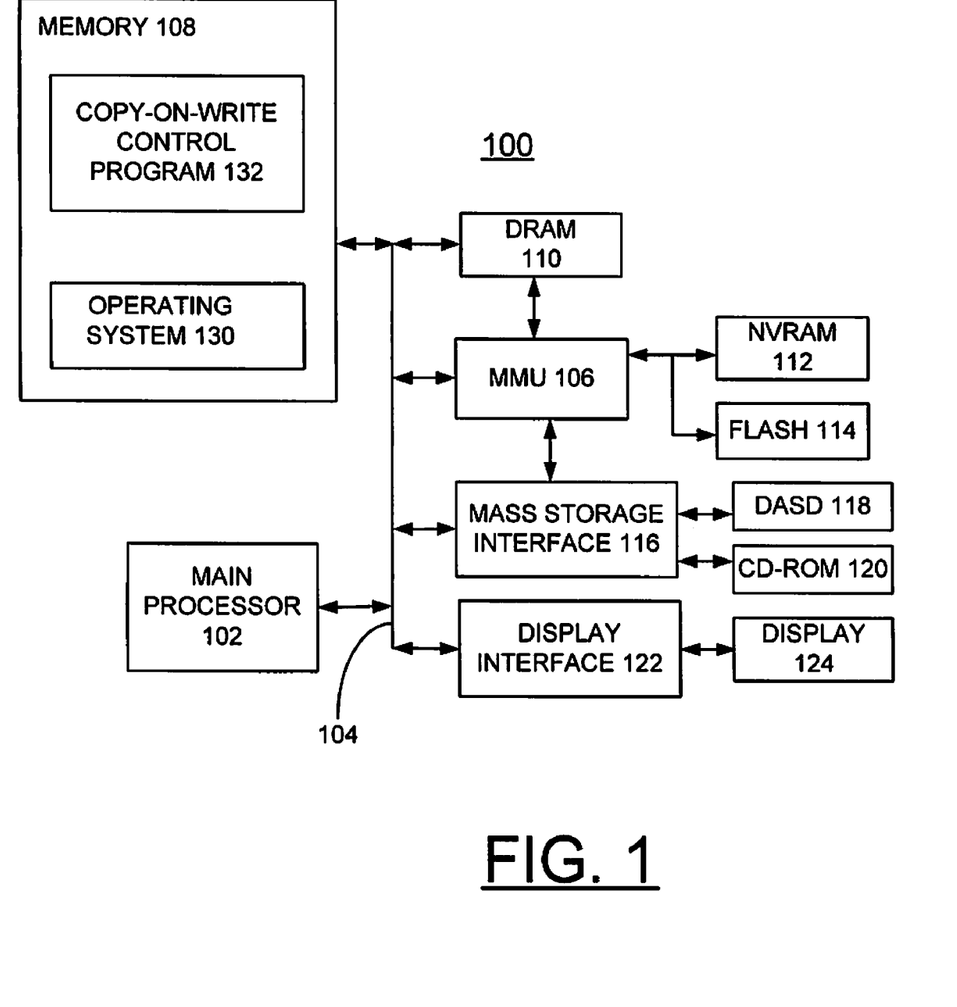
FIG. 1 is a schematic diagram of an exemplary computer system and operating system for implementing enhanced dynamic copy-on-write (COW) storage in accordance with the preferred embodiment.

Having reference now to the drawings, in FIG. 1, there is shown an exemplary computer system generally designated by the reference character 100 for carrying out methods for implementing enhanced dynamic copy-on-write storage compression in accordance with the preferred embodiments. Computer system 100 includes a main processor 102 or central processor unit (CPU) 102 coupled by a system bus 104 to a memory management unit (MMU) 106 and system memory including, a read only memory (ROM) 108, a dynamic random access memory (DRAM) 110, a nonvolatile random access memory (NVRAM) 112, and a flash memory 114. A mass storage interface 116 coupled to the system bus 104 and MMU 106 connects a direct access storage device (DASD) 118 and a CD-ROM drive 120 to the main processor 102. Computer system 100 includes a display interface 122 connected to a display 124. Computer system 100 includes an operating system 130 and a copy-on-write (COW) control program 132 in accordance with the preferred embodiments.

COW control program 132 in accordance with the preferred embodiments uses information identifying the liveness of data blocks written to a storage layer by any of various modern operating systems to enable COW storage to dynamically allocate and free storage based upon whether data blocks are in use or freed. COW control program 132 enables COW storage to shrink as data is deleted and to grow as data is added. COW control program 132 allows for much more efficient management of COW storage compared to existing implementations.

Computer system 100 is shown in simplified form sufficient for understanding the present invention. The illustrated computer system 100 is not intended to imply architectural or functional limitations. The present invention can be used with various hardware implementations and systems and various other internal hardware devices, for example, instead of a single main processor 102, multiple main processors can be used.

Figure 4:
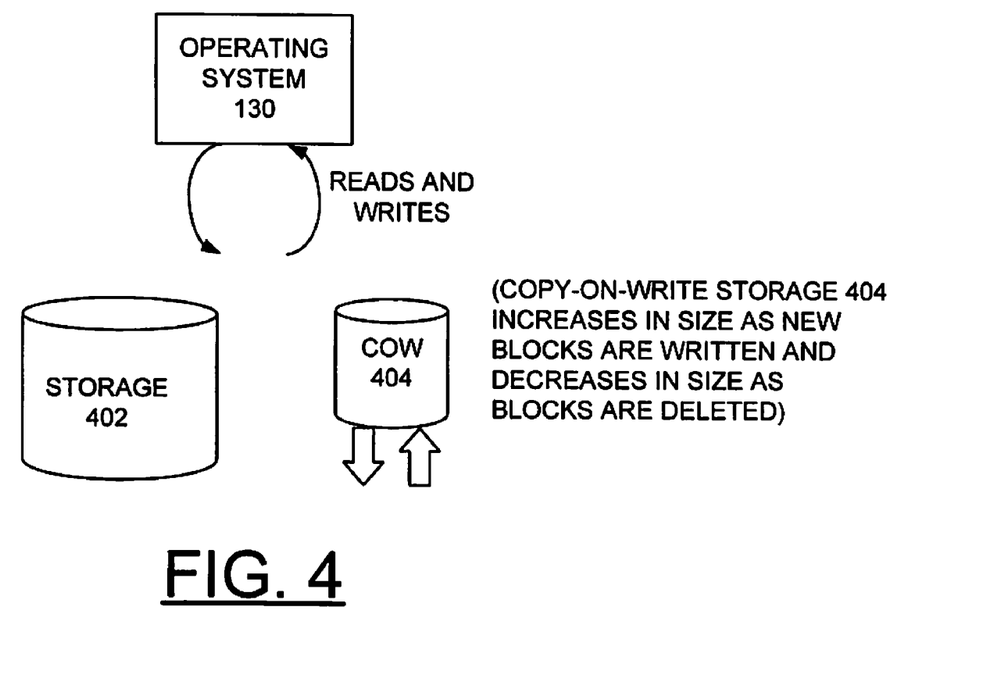
FIG. 4 is a schematic diagram illustrating enhanced dynamic copy-on-write (COW) storage in accordance with the preferred embodiments.

Referring also to FIG. 4, there is shown apparatus for carrying out methods for enhanced dynamic copy-on-write (COW) storage in accordance with the preferred embodiment. A view of storage of operating system 130 is shown with storage 402, such as read-only storage and copy-on-write (COW) storage 404 in accordance with the preferred embodiments. COW storage 404 in accordance with the preferred embodiments increases in size as new blocks are written and decreases in size as blocks are deleted.

It should be understood that in accordance with features of the preferred embodiments of the invention, correct functional operation is maintained for a COW storage 404 and operating system 130 in computer system 100 without implementing a COW control program. Also with a COW control program 132 in computer system 100 correct functional operation is maintained for the COW storage 404 and operating system 130 in computer system 100 implemented without implementing changes to the filesystem.

In accordance with features of one preferred embodiment of the invention, a method ensures that freed blocks are zeroed by the filesystem, and a check is implemented in the COW storage layer that detects and compresses zero blocks out of the COW copy. Writing zeros to a freed block or a pointer to a zero page can be used to zero freed blocks by the filesystem. This allows for COW storage 402 to dynamically allocate and free storage based on whether data blocks are in use or freed. COW storage 402 can shrink as data is deleted and grow as data is added and allows for much more efficient management of storage compared to existing implementations.

Figure 5:
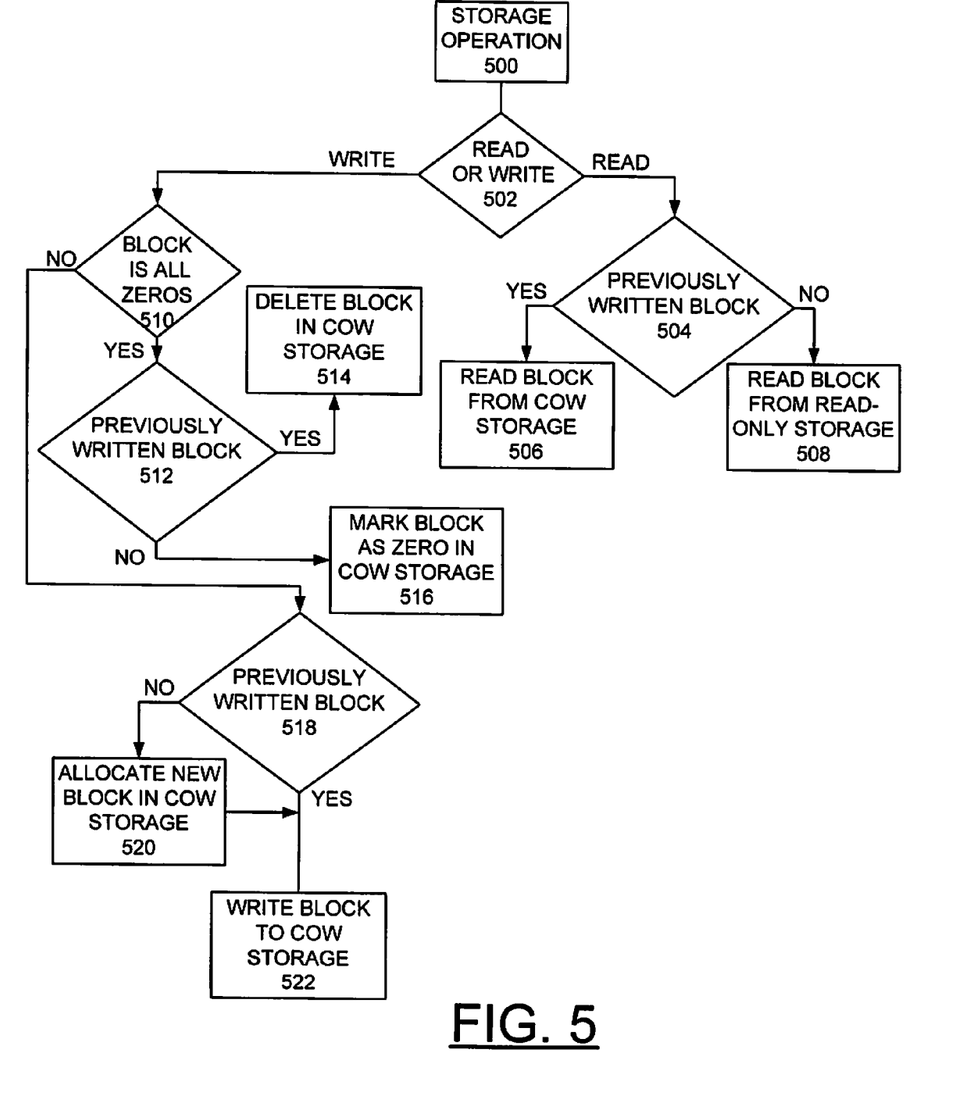
FIGS. 5, 6, 7, and 8 are flow charts illustrating exemplary steps for implementing enhanced dynamic copy-on-write (COW) storage in accordance with the preferred embodiments.

Referring also to FIG. 5, there are shown exemplary steps for implementing enhanced dynamic copy-on-write (COW) storage in accordance with one preferred embodiment of the invention for a storage operation starting at block 500. Checking for a read or write operation is performed as indicated in a decision block 502.

For a read operation checking for a previously written block to the COW storage is performed as indicated in a decision block 504. When a previously written block is identified, then a block is read form the COW storage 402 as indicated in a block 506. Otherwise when previously written block is not identified, then a block is read form the read-only storage 404 as indicated in a block 506.

In accordance with features of this preferred embodiment of the invention, to provide the enhanced COW storage implementation storage associated with zero blocks is recognized, and removed on the fly. Existing implementations do not distinguish a block of zeros written to COW storage from any other data written to COW storage. For example, where a 100 MB file is first written to a COW backed filesystem and then subsequently deleted, the deleted blocks are written with zeros by the filesystem, and the COW layer then removes the zero written blocks from the COW storage.

Existing small patches to the Linux operating system support writing zeros to the deleted blocks of filesystems, for example, see: *Keeping filesystem images sparse* for more information, which is herein incorporated by reference in its entirety. This existing patch is used either for security, to ensure that deleted data is not left on storage devices, or to "sparsify" files. A sparse file is similar to COW storage provided by the present invention, where zero blocks do not occupy space in the filesystem. Similar function could be implemented in any filesystem on any operating system, such as Windows, Solaris, or AIX.

For a write operation checking whether the block is all zeros is performed as indicated in a decision block 510. This zero-block recognition advantageously is implemented at a particular level that the COW function is implemented. For virtualization, for example VMWare or XEN, this is implemented in the virtual machine layer. For SAN storage implementing COW in the storage unit, the recognition can be implemented on the storage device.

When the block is all zeros, checking whether the write operation is for a previously written block as indicated in a decision block 512. For a write operation of a previously written block, the block is deleted in the COW storage as indicated in a block 514. Otherwise when not a previously written block, the block is marked as zero in the COW storage as indicated in a block 516.

Two possible ways of doing zero-block writes and recognitions within an operating system include the following. In the first, the filesystem sets a block of memory to zero, for example, using a function such as the C language memset( ) call, and issues the I/O to the block layer. This is the approach taken by the Linux patch. The COW layer then must examine each byte of a block to determine if the entire block is zero and, thus, can be compressed out or deleted. A more subtle approach is to make use of the fact that some operating systems, such as Linux, maintain one or more pages of memory within the OS kernel that are always zero, such as the "zero page." Rather than setting a block to zero and submitting it to the block layer, the filesystem can issue a write to the block layer where the I/O points to the zero page or zero pages. The COW layer then detects zero writes as any I/O whose buffer points to space within the zero page or zero pages.

When the block is not all zeros, checking whether the write operation is for a previously written block as indicated in a decision block 518. When not a previously written block, a new block is allocated in the COW storage as indicated in a block 520. Otherwise for a write operation of a previously written block, the block is written in the COW storage as indicated in a block 522.

In accordance with features of one preferred embodiment of the invention, a method ensures that freed blocks are detected by the COW storage without requiring any changes to the operating system 130 or filesystem of computer system 100. The COW storage control program 132 having a semantic understanding of the filesystem, analyzes the write operation and identifies a block being deleted from the filesystem to identify a freed block.

Figure 6:
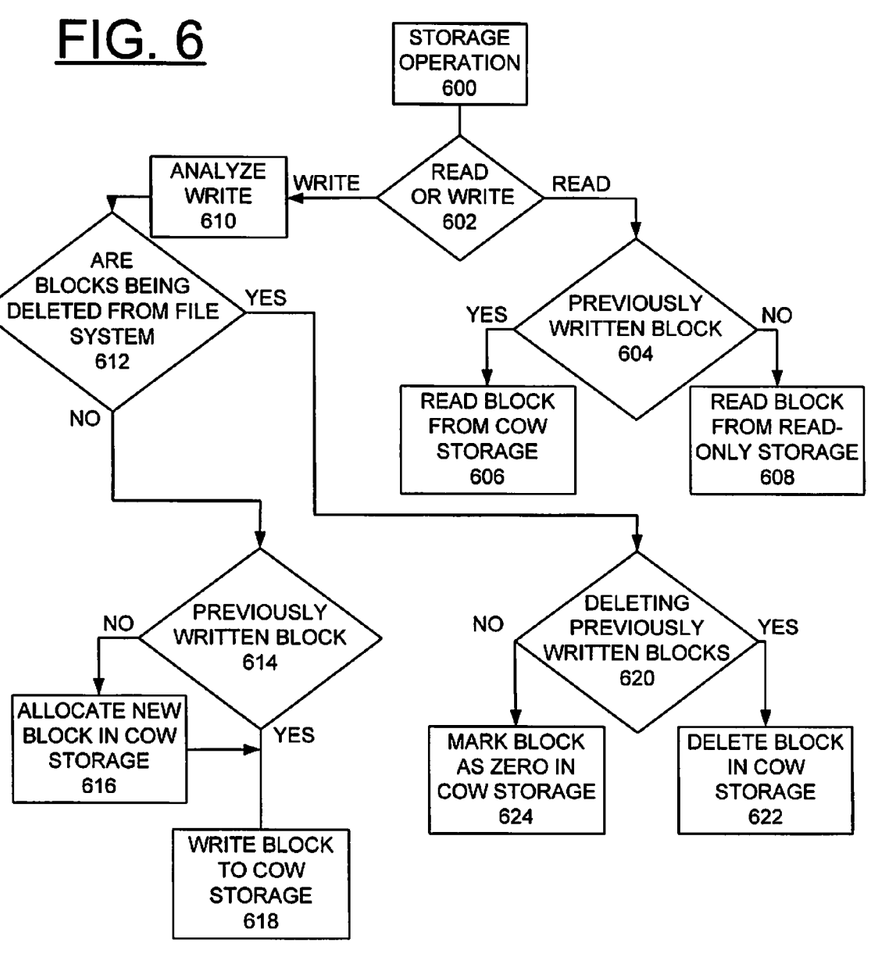

Referring also to FIG. 6, there are shown exemplary steps for implementing enhanced dynamic copy-on-write (COW) storage in accordance with one preferred embodiment of the invention for a storage operation starting at block 600. Checking for a read or write operation is performed as indicated in a decision block 602.

For a read operation checking for a previously written block to the COW storage is performed as indicated in a decision block 604. When a previously written block is identified, then a block is read form the COW storage 402 as indicated in a block 606. Otherwise when previously written block is not identified, then a block is read form the read-only storage 404 as indicated in a block 606.

In accordance with features of this preferred embodiment of the invention, by implementing semantic understanding of filesystem structures in the COW storage layer the enhanced COW storage implementation is provided. The COW storage layer advantageously is enhanced to understand the filesystem structures stored on the device to understand which block contain live or dead data. When COW blocks become dead, they advantageously are removed from the COW storage, reducing the size of the copy. This allows for COW storage to dynamically allocate and free storage based on whether data blocks are in use or freed. COW storage can shrink as data is deleted and grow as data is added, thus allowing for much more efficient management of storage as compared to existing implementations.

A recent OSDI 2004 research paper from the University of Wisconsin identifies how intelligence can be added to the storage layer to understand the liveness of data. See: *Life or Death at Block-Level* for more information, which is herein incorporated by reference in its entirety. The paper addresses the usefulness of this information for zeroing deleted blocks for security reasons.

It should be understood that substantially identical techniques advantageously are applied to COW storage implementations to enable dynamically changing COW storage. The research paper demonstrates how the technique can be applied to both Linux, ext2, ext3, as well as Windows, NTFS and FAT filesystems. Additional implementations could understand any filesystem, such as those used by Solaris.

For a write operation, the write operation is analyzed as indicated in a block 610. Checking whether the block or blocks are being deleted is performed as indicated in a decision block 612. When one or more blocks are not being deleted, checking whether the write operation is for a previously written block as indicated in a decision block 614. When not a previously written block, a new block is allocated in the COW storage as indicated in a block 616. Otherwise for a write operation of a previously written block, the block is written in the COW storage as indicated in a block 618.

In accordance with features of this preferred embodiment of the invention, at a high level, the COW storage layer understands filesystem constructs, such as the block bitmap that identify which blocks on the storage device are in use and which are deleted. The COW storage layer then makes use of that data to understand and manage its storage of data. For example, when a file is deleted, typically the block bitmap, which is a bitmap describing which blocks on the device are in use, is updated, and written to the device, to indicate that a series of blocks are now not in use. The deleted blocks themselves are not written to. When the COW storage layer, which has been enhanced in accordance with features of this preferred embodiment to understand the filesystem structures, notices the writes to the block bitmaps, it makes use of that information to dynamically manage COW storage in accordance with features of this preferred embodiment.

In accordance with features of this preferred embodiment of the invention, this file-system understanding advantageously is implemented at a particular level that the COW function is implemented. For example, with virtualization VMWare or XEN, this is implemented in the virtual machine layer. For SAN storage implementing COW in the storage unit, the understanding advantageously is implemented on the storage device.

When one or more blocks are being deleted, checking whether the write operation is deleting previously written blocks as indicated in a decision block 620. When deleting previously written block or blocks, the block or blocks from COW storage are deleted or freed from COW storage as indicated in a block 622. When not deleting previously written block or blocks, the block or blocks from COW storage are marked as zero in the COW storage as indicated in a block 624.

In accordance with features of one preferred embodiment of the invention, a method ensures that freed blocks are detected by the COW storage by adding a new I/O flag within the I/O stack of the operating system to indicate references to purgeable data. COW storage control program 132 detects the I/O purgeable data flag and identifies a block being deleted or freed from the filesystem.

Figure 7:
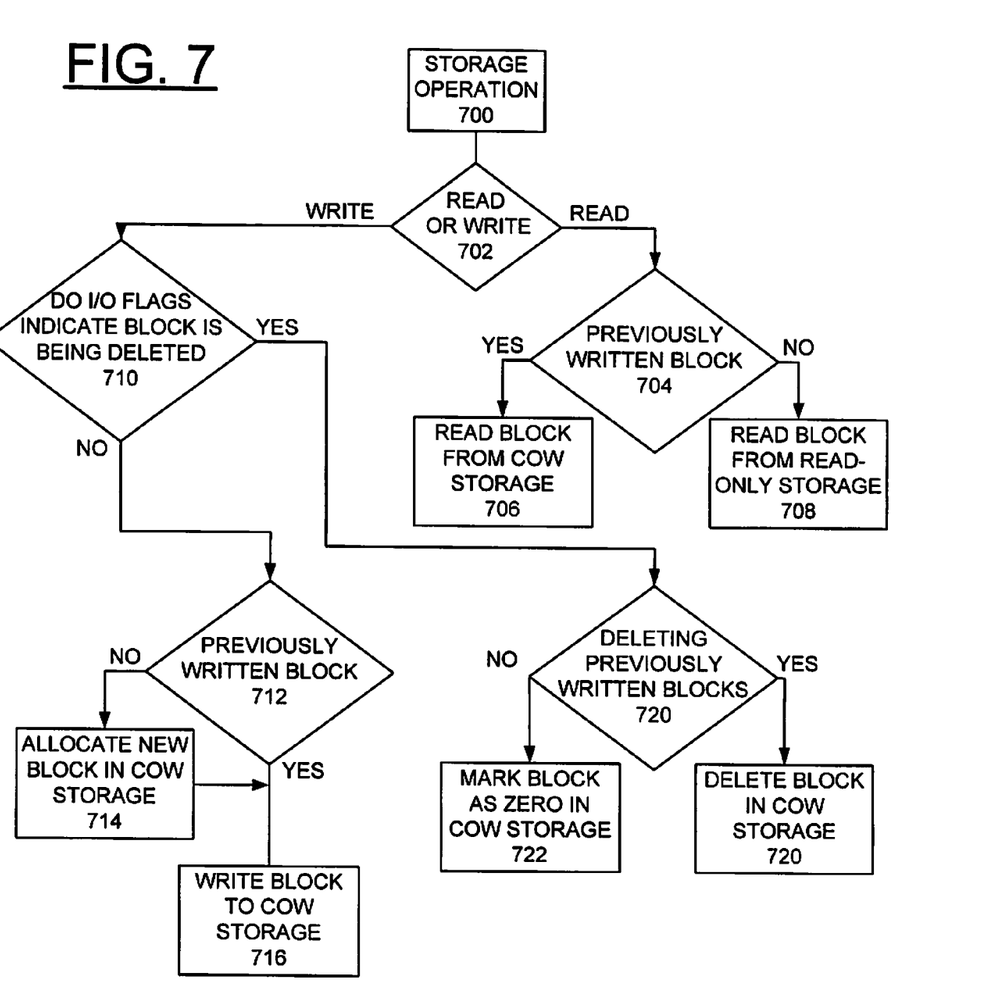

Referring also to FIG. 7, there are shown exemplary steps for implementing enhanced dynamic copy-on-write (COW) storage in accordance with one preferred embodiment of the invention for a storage operation starting at block 700. Checking for a read or write operation is performed as indicated in a decision block 702.

For a read operation checking for a previously written block to the COW storage is performed as indicated in a decision block 704. When a previously written block is identified, then a block is read form the COW storage 402 as indicated in a block 706. Otherwise when previously written block is not identified, then a block is read form the read-only storage 404 as indicated in a block 706.

In accordance with features of this preferred embodiment of the invention, to provide the enhanced COW storage implementation a new input/output (I/O) flag is added within the I/O stack of an operating system to indicate that an I/O references "purgeable" data. A typical implementation advantageously adds a purgeable flag to the write operation for deleted blocks, indicating that the data being written is irrelevant and that the associated blocks can be deleted.

In accordance with features of this preferred embodiment of the invention, this method allows for COW storage to dynamically allocate and free storage based on whether data blocks are in use or freed. COW storage shrinks as data is deleted and grows as data is added and allows for much more efficient management of storage compared to existing implementations.

For a write operation, checking I/O flags to indicate whether the block or blocks are being deleted is performed as indicated in a decision block 710. When one or more blocks are not being deleted, checking whether the write operation is for a previously written block as indicated in a decision block 712. When not a previously written block, a new block is allocated in the COW storage as indicated in a block 714. Otherwise for a write operation of a previously written block, the block is written in the COW storage as indicated in a block 716.

A number of flags are associated with I/O operations within an operating system. Typical examples are barrier flags, which indicate that other I/O cannot be re-scheduled around this one, or read ahead flags indicating that a given I/O is a read-ahead operation that can be prioritized differently than non-read-ahead I/O.

In accordance with features of this preferred embodiment of the invention, a prototype implementation has been made within Linux operating system by adding a "purgeable" I/O flag to the operating system I/O structures. The purgeable flag is set on blocks deleted within a filesystem, and understood by the COW storage layer. The COW layer advantageously frees any blocks that are indicated as purgeable and reduces the size of the COW storage. The flag is passed along to a particular level that the COW function is implemented. For example for virtualization, VMWare or XEN, this purgeable I/O flag is implemented in the virtual machine layer. For SAN storage implementing COW in the storage unit, this purgeable I/O flag is implemented on the storage device.

When I/O flags indicate the block or blocks are being deleted, checking whether the write operation is deleting previously written blocks as indicated in a decision block 718. When deleting previously written block or blocks, the block or blocks from COW storage are deleted or freed from COW storage as indicated in a block 720. When not deleting previously written block or blocks, the block or blocks from COW storage are marked as zero in the COW storage as indicated in a block 722.

In accordance with features of one preferred embodiment of the invention, a method ensures that freed blocks are detected by the COW storage by adding a new purge function call to indicate references to purgeable data. A device driver implementing storage functions for COW storage, such as reads and writes, implements the purge function call indicating purgeable data. COW storage control program 132 detects the purge function call and identifies a block being deleted or freed from the filesystem.

Figure 8:
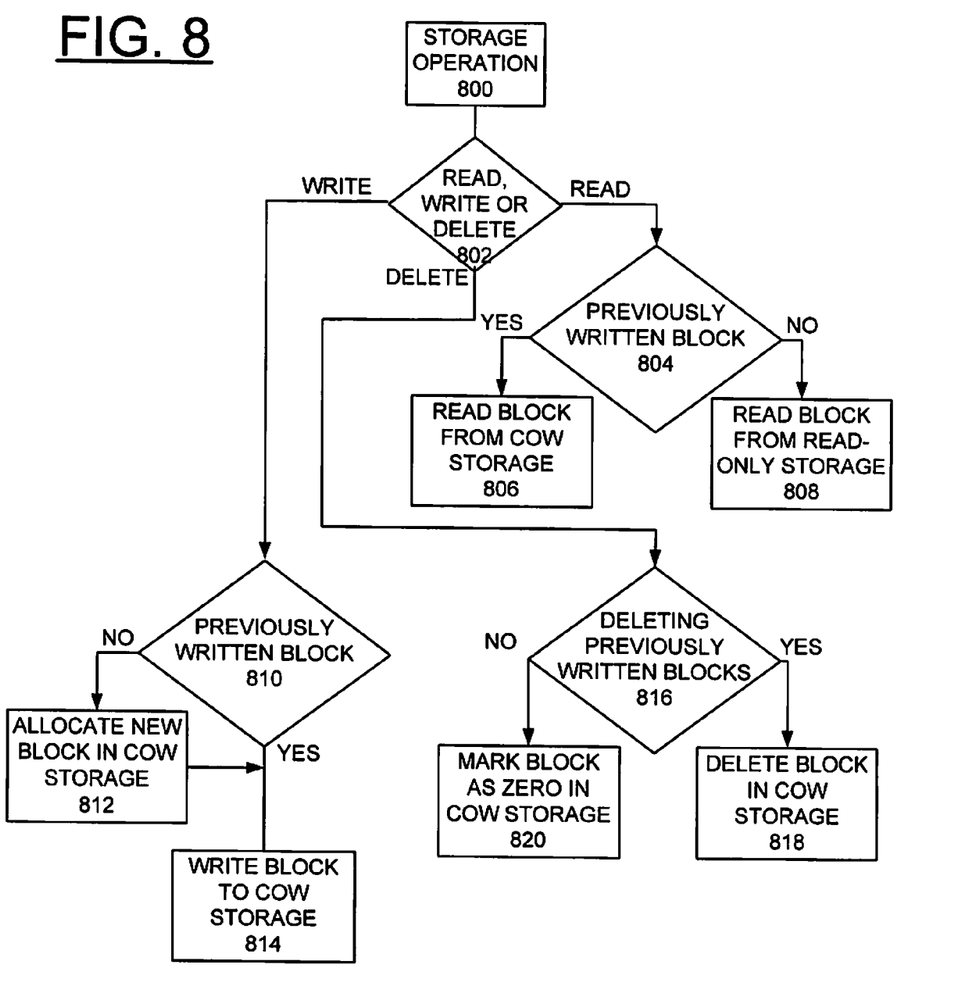

Referring also to FIG. 8, there are shown exemplary steps for implementing enhanced dynamic copy-on-write (COW) storage in accordance with one preferred embodiment of the invention for a storage operation starting at block 800. Checking for a read, write, or delete operation is performed as indicated in a decision block 802.

For a read operation checking for a previously written block to the COW storage is performed as indicated in a decision block 804. When a previously written block is identified, then a block is read form the COW storage 402 as indicated in a block 806. Otherwise when previously written block is not identified, then a block is read form the read-only storage 404 as indicated in a block 806.

In accordance with features of this preferred embodiment of the invention, to provide the enhanced COW storage implementation an implementation of a new function, "purge", is provided and used to identify blocks of data that can be purged from underlying storage. This allows for COW storage to dynamically allocate and free storage based on whether data blocks are in use or freed. COW storage advantageously shrinks as data is deleted and grows as data is added and allows for much more efficient management of storage compared to existing implementations.

In accordance with features of this preferred embodiment, the new function, purge, is added to a fixed set of functions such as open, close, read, and write that device drivers typically implement in any operating system.

When a write operation identified at decision block 802, checking whether the write operation is for a previously written block is performed as indicated in a decision block 810. When not a previously written block, a new block is allocated in the COW storage as indicated in a block 812. Otherwise for a write operation of a previously written block or after the new lock is allocated at block 812, the block is written in the COW storage as indicated in a block 814.

For a delete operation identified at decision block 802, checking whether the delete operation is deleting previously written blocks as indicated in a decision block 816. When deleting previously written block or blocks, the block or blocks from COW storage are deleted or freed from COW storage as indicated in a block 818. When not deleting previously written block or blocks, the block or blocks from COW storage are marked as zero in the COW storage as indicated in a block 820.

In accordance with features of this preferred embodiment, a prototype implementation has been made within Linux of adding a purge function to a COW block device. The filesystem implements a call to the purge function when blocks are deleted to indicate to the block layer that one or more blocks no longer contain valid data. The COW layer frees any blocks that are indicated as purgeable and reduce the size of the COW storage.

Figure 9:
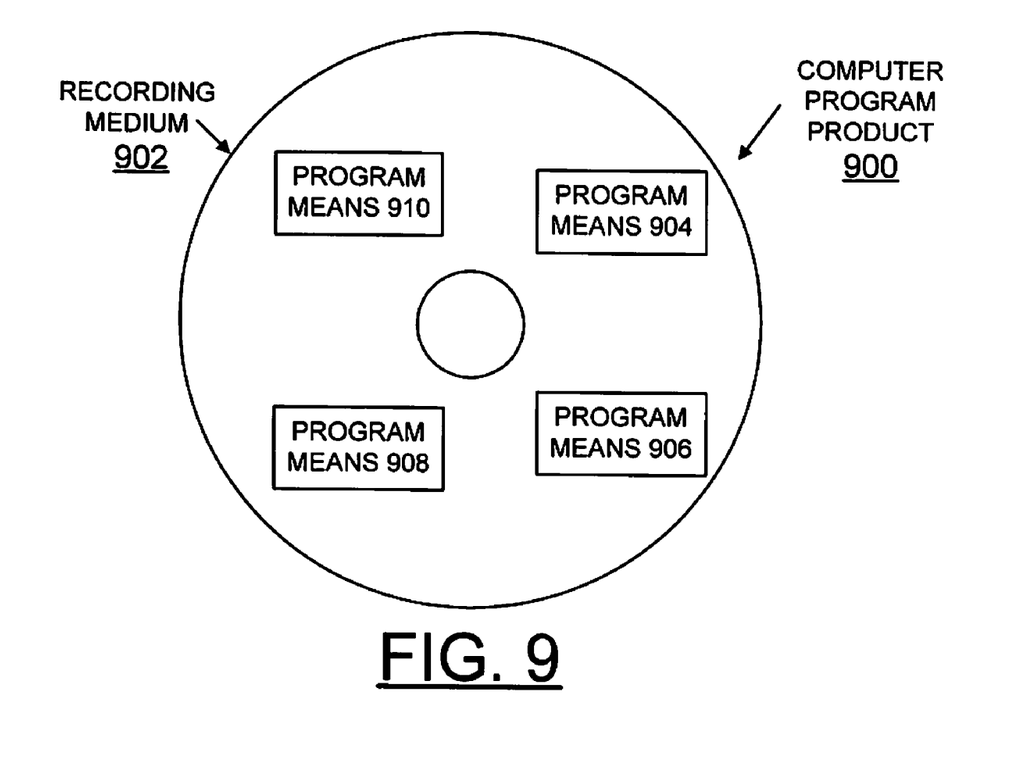
FIG. 9 is a block diagram illustrating a computer program product in accordance with the preferred embodiments.

Referring now to FIG. 9, an article of manufacture or a computer program product 900 of the invention is illustrated. The computer program product 900 includes a recording medium 902, such as, a floppy disk, a high capacity read only memory in the form of an optically read compact disk or CD-ROM, a tape, or a similar computer program product. Recording medium or computer storage medium 902 stores program means 904, 906, 908, 910 on the medium 902 for carrying out the methods for implementing enhanced dynamic copy-on-write storage compression of the preferred embodiment in the system 100 of FIG. 1.

A sequence of program instructions or a logical assembly of one or more interrelated modules defined by the recorded program means 904, 906, 908, 910, direct the computer system 100 for implementing enhanced dynamic copy-on-write storage compression of the preferred embodiment.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

While the present invention has been described with reference to the details of the embodiments of the invention shown in the drawing, these details are not intended to limit the scope of the invention as claimed in the appended claims.

What is claimed is:

1. A method for implementing dynamic copy-on-write (COW) storage compression comprising:
    detecting a freed block for a write operation by COW storage, said detected freed block being used for compressing freed blocks from the COW storage;
    responsive to identifying the detected freed block as a previously written block in the COW storage, deleting the previously written block from the COW storage;
    responsive to the detected freed block not being a previously written block in the COW storage, marking the block as zero in the COW storage; and
    responsive to detecting a block not being freed for the write operation by COW storage, allocating a new block in COW storage only responsive to identifying the detected block not being freed as not being a previously written block.

2. The method for implementing dynamic copy-on-write (COW) storage compression as recited in claim 1 includes zeroing a freed block by the filesystem.

3. The method for implementing dynamic copy-on-write (COW) storage compression as recited in claim 2 wherein detecting a freed block for a write operation by COW storage includes detecting a block for the write operation including all zeros to identify said freed block.

4. The method for implementing dynamic copy-on-write (COW) storage compression as recited in claim 2 wherein detecting a freed block for a write operation by COW storage includes detecting a zero page pointer for the write operation to identify said freed block.

5. The method for implementing dynamic copy-on-write (COW) storage compression as recited in claim 1 wherein detecting a freed block for a write operation by COW storage includes analyzing the write operation and identifying a block being deleted from the filesystem to identify said freed block by the COW storage.

6. The method for implementing dynamic copy-on-write (COW) storage compression as recited in claim 1 wherein a computer system is implemented without implementing changes to the filesystem and further includes maintaining correct functional operation for COW storage and an operating system in the computer system with a COW control program implemented in the computer system.

7. The method for implementing dynamic copy-on-write (COW) storage compression as recited in claim 1 includes responsive to detecting a block not being freed for a write operation by COW storage, and responsive to identifying the detected block not being freed as a previously written block in the COW storage, writing the detected block in COW storage.

8. The method for implementing dynamic copy-on-write (COW) storage compression as recited in claim 1 wherein responsive to detecting a block not being freed for a write operation by COW storage, and, allocating a new block in COW storage only responsive to identifying the detected block as not being a previously written block in the COW storage, further includes writing the detected block in COW storage.

9. Apparatus for implementing dynamic copy-on-write (COW) storage compression in a COW storage comprising:
    a COW storage control detecting a freed block for a write operation, said detected freed block being used for compressing freed blocks from the COW storage;
    said COW storage control, responsive to identifying the detected freed block as a previously written block in the COW storage, deleting the previously written block from the COW storage;
    said COW storage control responsive to the detected freed block not being a previously written block in the COW storage, marking the detected block as zero in the COW storage; and
    said COW storage control responsive to detecting a block not being freed for the write operation by COW storage, allocating a new block in COW storage only responsive to identifying the detected block not being freed as not being a previously written block.

10. The apparatus for implementing dynamic copy-on-write (COW) storage compression as recited in claim 9 includes a filesystem zeroing a freed block.

11. The apparatus for implementing dynamic copy-on-write (COW) storage compression as recited in claim 10 wherein said COW storage control detects a block for the write operation including all zeros to identify said freed block.

12. The apparatus for implementing dynamic copy-on-write (COW) storage compression as recited in claim 10 wherein said COW storage control detects a zero page pointer for the write operation to identify said freed block.

13. The apparatus for implementing dynamic copy-on-write (COW) storage compression as recited in claim 9 wherein said COW storage control analyzes the write operation and identifies a block being deleted from the filesystem to identify said freed block.

14. The apparatus for implementing dynamic copy-on-write (COW) storage compression as recited in claim 9 further includes said COW storage control responsive to detecting a block not being freed for a write operation by COW storage, and responsive to identifying the detected block not being freed as being a previously written block, writing the detected block in COW storage.

15. The apparatus for implementing dynamic copy-on-write (COW) storage compression as recited in claim 9 wherein a computer system is implemented without implementing changes to a filesystem and wherein correct functional operation for COW storage and an operating system is maintained in the computer system with said COW control implemented in the computer system.

16. A computer storage medium storing a computer program product for implementing dynamic copy-on-write (COW) storage compression in a COW storage, said computer program product including a plurality of computer executable instructions stored on said computer storage medium, wherein said instructions, when executed by said COW storage, cause said COW storage to perform the steps of:
    detecting a freed block for a write operation, said detected freed block being used for compressing freed blocks from the COW storage;
    responsive to identifying the detected freed block as a previously written block in the COW storage, deleting the previously written block from the COW storage;
    responsive to the detected freed block not being a previously written block in the COW storage, marking the block as zero in the COW storage; and responsive to detecting a block not being freed for the write operation by COW storage, allocating a new block in COW storage only responsive to identifying the detected block not being freed as not being a previously written block.

17. A computer storage medium storing a computer program product for implementing dynamic copy-on-write (COW) storage compression as recited in claim 16 wherein detecting a freed block for a write operation includes detecting a block for the write operation including all zeros to identify said freed block.

18. A computer storage medium storing a computer program product for implementing dynamic copy-on-write (COW) storage compression as recited in claim 16 wherein detecting a freed block for a write operation includes detecting a zero page pointer for a block for the write operation to identify said freed block.

19. A computer storage medium storing a computer program product for implementing dynamic copy-on-write (COW) storage compression as recited in claim 16 wherein detecting a freed block for a write operation includes analyzing the write operation and identifies a block being deleted from the filesystem to identify said freed block.

20. A computer storage medium storing a computer program product for implementing dynamic copy-on-write (COW) storage compression as recited in claim 16 further includes responsive to detecting a block not being freed for a write operation, and responsive to identifying the detected block not being freed as being a previously written block, writing the detected block in COW storage.

* * * * *